Figure 1:
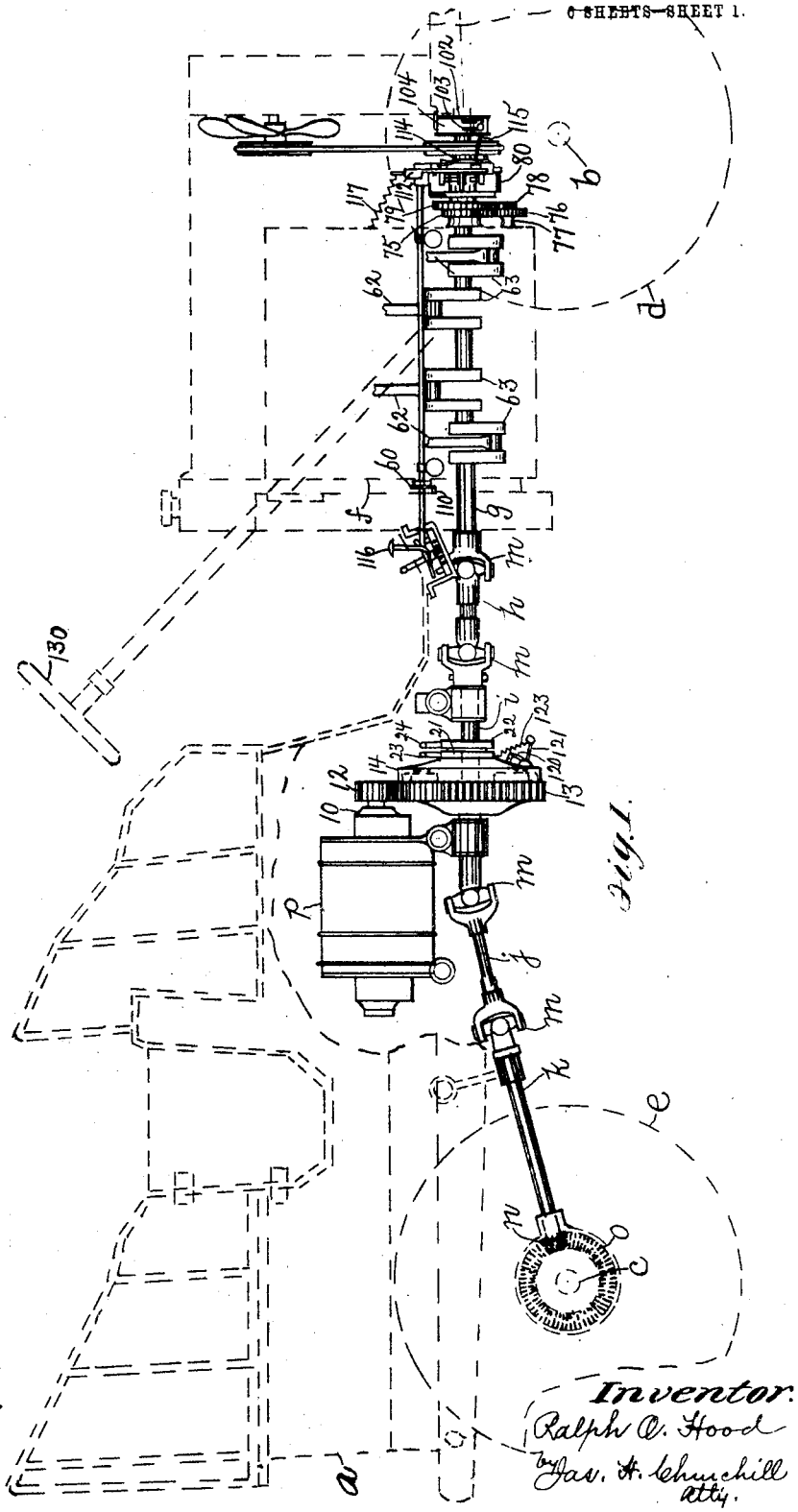

No. 799,851. PATENTED SEPT. 19, 1905.
R. O. HOOD.
MOTOR VEHICLE.
APPLICATION FILED NOV. 11, 1904.
6 SHEETS—SHEET 1.

Witnesses.
Inventor:
Ralph O. Hood
by Jas. H. Churchill
atty.

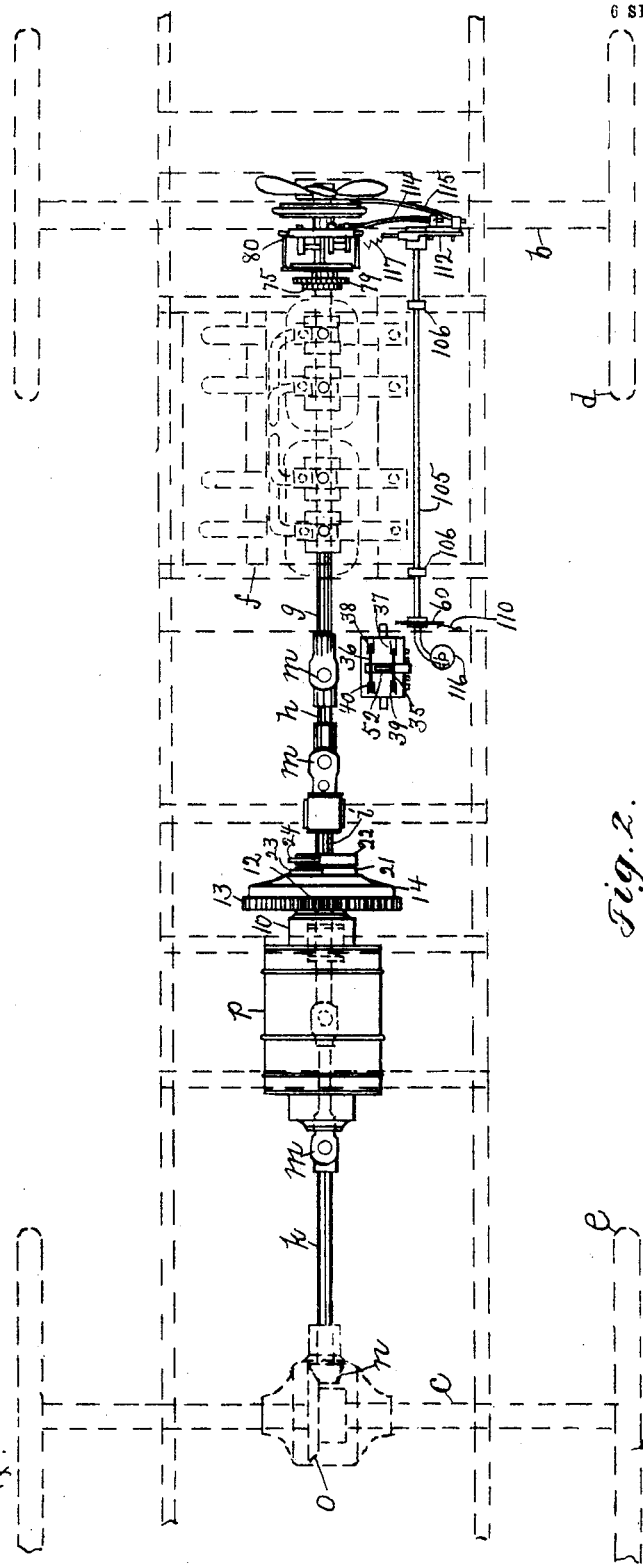

No. 799,851.   
PATENTED SEPT. 19, 1905.  
R. O. HOOD.  
MOTOR VEHICLE.  
APPLICATION FILED NOV. 11, 1904.
6 SHEETS—SHEET 3.
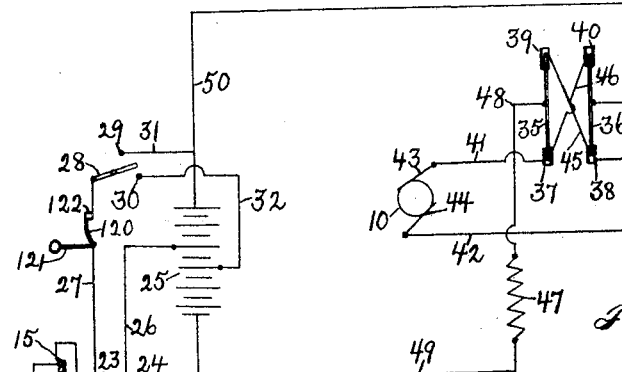
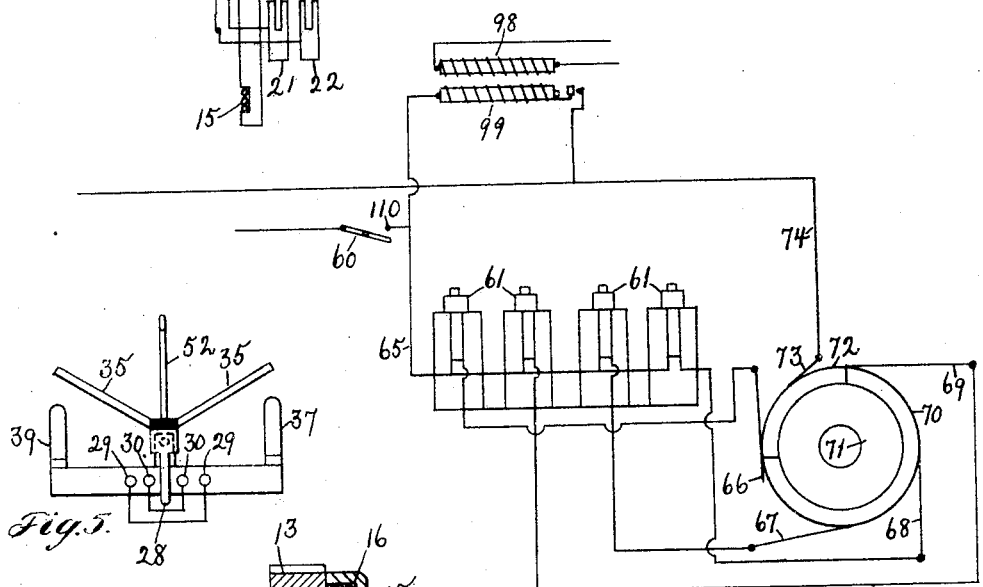
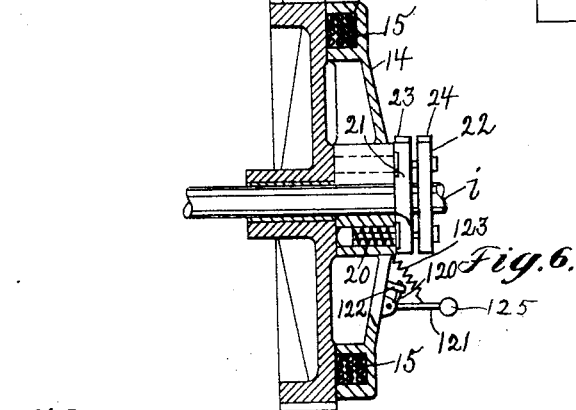
Witnesses.
Inventor  
Ralph O. Hood  
by Jas. H. Churchill  
atty.

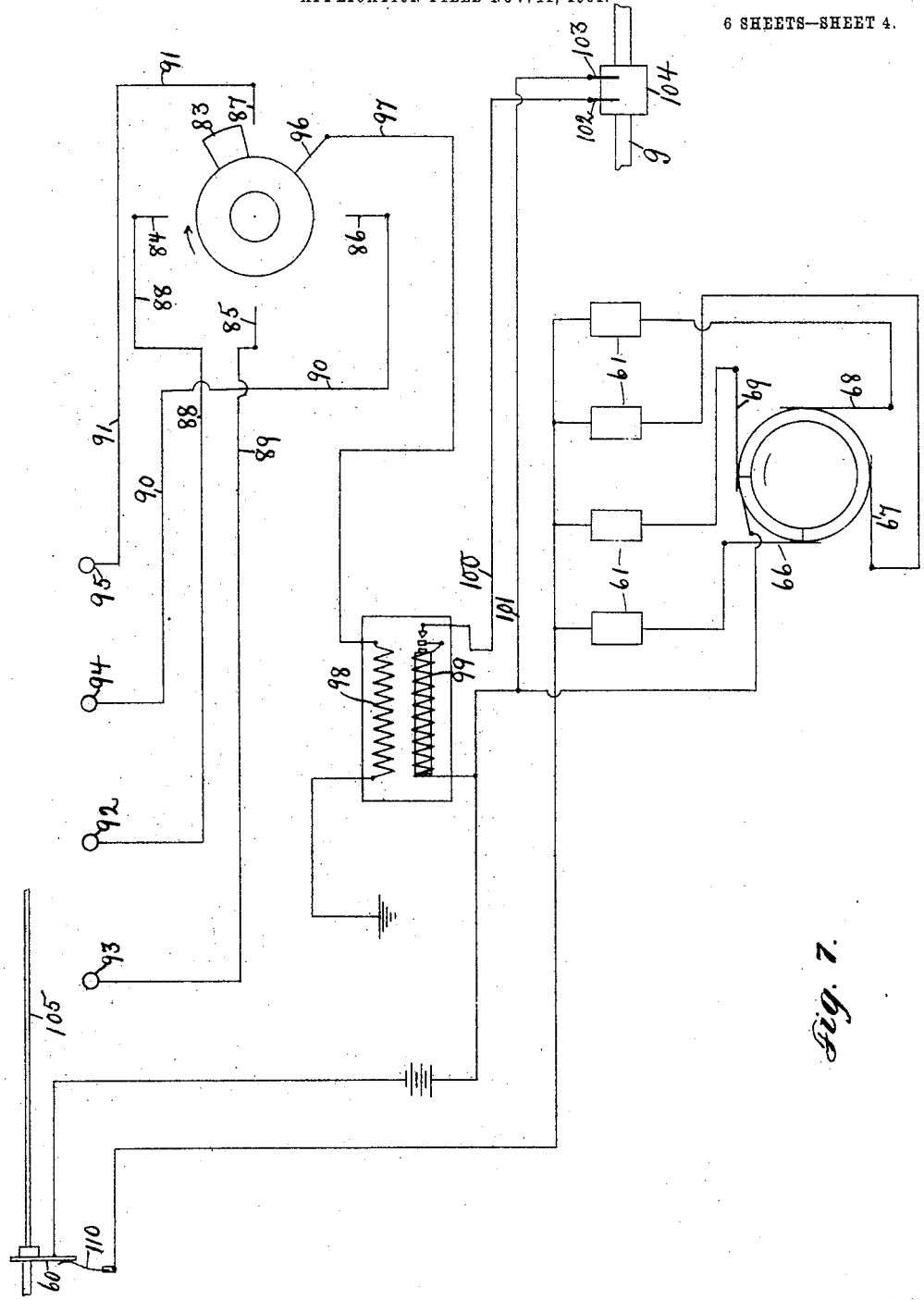

No. 799,851. PATENTED SEPT. 19, 1905.
R. O. HOOD.
MOTOR VEHICLE.
APPLICATION FILED NOV. 11, 1904.

6 SHEETS—SHEET 5.

Witnesses.
Inventor:
Ralph O. Hood
by Jas. H. Churchill
Atty.

No. 799,851. PATENTED SEPT. 19, 1905.
R. O. HOOD.
MOTOR VEHICLE.
APPLICATION FILED NOV. 11, 1904.

6 SHEETS—SHEET 6.

Witnesses.
B. H. Gannett
J. Murphy

Inventor.
Ralph O. Hood
by Jas. H. Churchill
atty.

UNITED STATES PATENT OFFICE.

RALPH O. HOOD, OF DANVERS, MASSACHUSETTS.

MOTOR-VEHICLE.

No. 799,851.  Specification of Letters Patent.  Patented Sept. 19, 1905.

Application filed November 11, 1904. Serial No. 232,309.

*To all whom it may concern:*

Be it known that I, RALPH O. HOOD, a citizen of the United States, residing in Danvers, in the county of Essex and State of Massachusetts, have invented an Improvement in Motor-Vehicles, of which the following description, in connection with the accompanying drawings, is a specification, like characters on the drawings representing like parts.

This invention relates to motor-vehicles of that class employing an explosion-engine as the primary means for propelling the vehicle.

The present invention has for its object to provide motor-vehicles of the class referred to with an electric motor which is connected with the driven shaft of the vehicle by mechanism which enables the electric motor to be made of minimum size and weight with a maximum pulling effect on the driven shaft, which is usually the rear axle of the vehicle.

Another feature of the present invention consists in a magnetic clutch by which the electric motor may be coupled to the driving mechanism, which connects the gas-engine with the rear axle, whereby the motor may be coupled to said driving mechanism substantially in an instant by movement of a switch under the control of the operator.

The motor referred to is of the series type and is adapted to be connected with a storage battery carried by the vehicle, so that the electric motor may be employed to start the vehicle and to assist the gas-engine under certain conditions or may be used as a dynamo to charge the storage batteries when desired.

The gas-engine may and preferably will be provided with magnetically-operated valves, which are included in a circuit provided with a switch, which may and preferably will be operated by the foot of the operator, whereby the said valves may be brought into action substantially in an instant or may be cut out of operation and left in their open condition, so that when the vehicle is started in motion by the electric motor the piston of the gas-engine is also set in motion and runs free, owing to the open condition of the said valves, thereby relieving the motor from extra work which would be imposed upon it if the piston were operated with the valves closed, thus economizing in the size and cost of said electric motor. Provision is also made for controlling the speed of the engine by mechanism actuated by the foot of the operator. These and other features of this invention will be pointed out in the claims at the end of this specification.

Figures 8, 9:
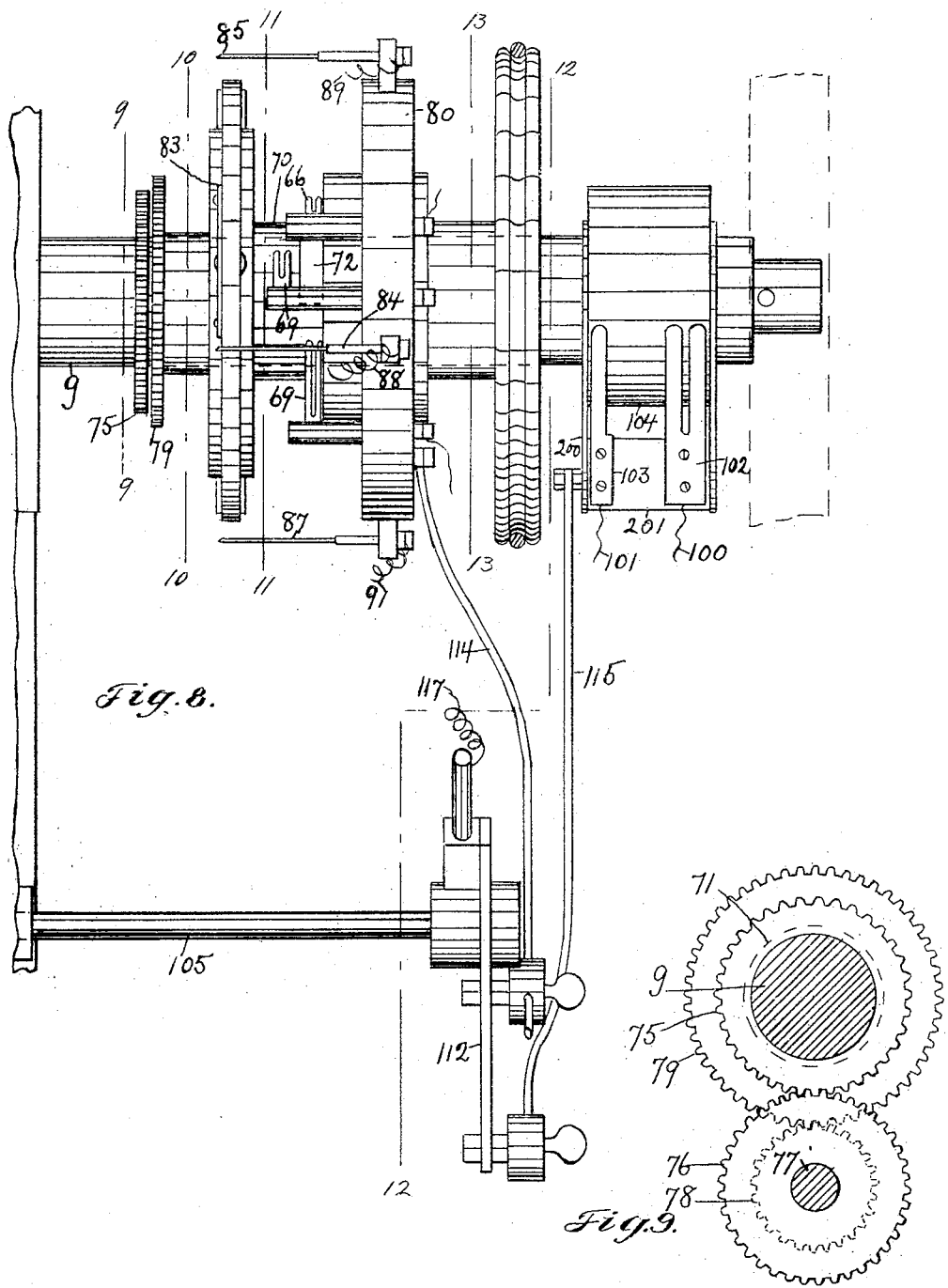
Figure 10:
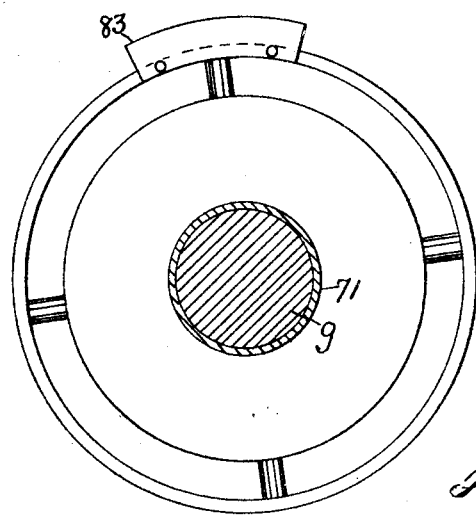
Figure 11:
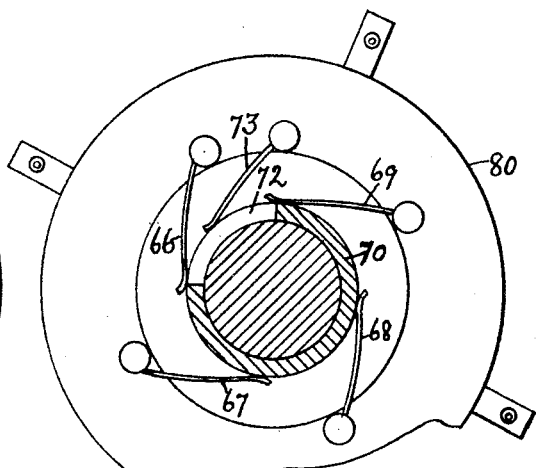
Figure 12:
Figure 13:
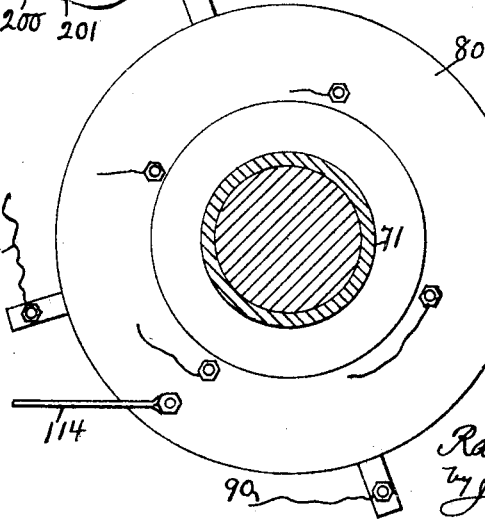

Figure 1 represents in side elevation a motor-vehicle embodying this invention, the body being shown in dotted lines; Fig. 2, a plan view of Fig. 1; Figs. 3 and 4, diagrams of circuits to be referred to; Figs. 5 and 6, details to be referred to; Fig. 7, a diagram of circuits to be referred to; Fig. 8, a detail in side elevation, on an enlarged scale, to be referred to; Fig. 9, a detail in section taken on the line 9 9, Fig. 8; Fig. 10, a detail in section taken on the line 10 10, Fig. 8; Fig. 11, a detail in section taken on the line 11 11, Fig. 8; Fig. 12, a detail in section taken on the line 12 12, Fig. 8; and Fig. 13, a detail in section, taken on the line 13 13, Fig. 8.

Referring to the drawings, $a$ represents a vehicle-body of any suitable construction and which is suitably mounted upon front and rear axles $b$ $c$, provided with wheels $d$ $e$. In accordance with this invention the vehicle is propelled by a motor mechanism comprising a prime motor and a secondary or auxiliary motor. The prime motor consists of a gasolene-engine $f$, having its crank-shaft $g$ connected directly with the rear axle or driven shaft $c$. The crank-shaft $g$ is provided, as shown, with four sections $h$ $i$ $j$ $k$, which are connected together by knuckle-joints $m$, the shaft-section $k$, having a bevel-pinion $n$, which meshes with a bevel-gear $o$, fast on the rear axle $c$. The auxiliary motor consists of an electric motor $p$, provided with a series-wound field-coil and having its armature 10 provided with a pinion 12, in mesh with a gear 13, which constitutes the armature of a magnetic clutch, which may be made as herein shown (see Fig. 6) and consists of a substantially heavy disk 14, fast on the shaft-section $i$, and a winding or coil 15 within an annular groove 16. The gear 13 is loose on the shaft-section $i$ and is adapted to be moved longitudinally thereon in one direction by magnetic attraction, so as to couple the motor with the crank-shaft of the engine, and thereby with the shaft $c$ to be driven, and to be moved longitudinally thereon in the opposite direction by magnetic repulsion, preferably assisted by springs 20. (See Fig. 6.) The shaft-section $i$ has mounted on it two collector-rings 21 22, to which the ends of the coil 15 are connected and with which coöperate suitable brushes 23 24, (see Fig. 3,) which are connected to cells of a storage battery 25, carried by the vehicle. As represented in Fig. 3, the brush 24 is connected by wire 26 with one pole of an intermediate cell of the storage battery 25, and the other brush 23 is connected by the wire 27 with a switch-lever 28, which coöperates with two terminals 29 30, one, as 29, being connected by wire 31 to an end pole of the storage battery and the other terminal being connected by wire 32 to a pole of the storage battery on the opposite side of the pole to which the wire 26 is connected.

The circuit of the electric motor is controlled by a switch shown in Fig. 3 as separate from the switch 28 and consisting of the blades or levers 35 36, which coöperate with two sets of terminals 37 38 39 40, the terminals 37 38 being connected in circuit with the armature 10 by the wires 41 42 and brushes 43 44 and the terminal 39 being connected by wire 45 to the terminal 38 and the terminal 40 to the terminal 37 by wire 46. The blades 35 36 are in series with the field-coil 47 of the electric motor $p$ and with the storage battery 25, the blade 35 being connected by the wire 48 with one end of the field-coil 47, the other end of which is connected by wire 49 with one end of the storage battery 25, the other end of which is connected by wire 50 with the blade 36.

From the above description and by inspection of Fig. 1 it will be seen that the crank-shaft of the gasolene-engine is directly connected with the driven shaft or axle $c$ and that the electric motor is geared down, preferably in practice five to one, so that a maximum pulling effect is obtained with an electric motor of minimum size and cost.

In operation with the apparatus as thus far described the operator in order to start the vehicle moves the switch 28 onto the terminal 29 to complete the circuit through the magnetic clutch, which attracts its armature—namely, the gear 13—and renders the same fast on the crank-shaft of the gasolene-engine. The switches 35 36 are also moved into engagement with the terminals 37 38 to connect the electric motor with the storage battery. The armature 10 is thus set in rotation and the vehicle set in motion by the driving mechanism, comprising the pinion 12, gear 13, the crank-shaft extensions $i$ $j$ $k$, and bevel-gears $n$ $o$. The vehicle is thus started in motion by the electric motor, which also effects reciprocation of the pistons in the cylinders of the engine; but inasmuch as the exhaust-valves of the engine are in their open position the reciprocation of the pistons imposes substantially little extra work on the motor, yet places the engine in condition to be brought into operation substantially in an instant, which may be effected, as represented in Fig. 4, by the operator closing a switch 60, which switch controls the circuit of the magnetic valves 61. (Also represented in Fig. 4.) When the switch is closed and the magnetic valves are brought into operation, the circuit of the sparking plug or igniter is also closed and the said igniter is brought into operation. The vehicle is then propelled by the prime motor or gasolene-engine assisted by the electric motor, and when the engine is working nicely the switch 28 may be opened and engaged with the terminal 30 to reverse the current from the storage battery through the magnetic clutch, and thereby cause the gear-armature to be disconnected from the crank-shaft. At the same time the switch-levers 35 36 may be opened to disconnect the electric motor from the storage battery, whereupon the electric motor becomes stationary or idle, or the magnetic clutch may be again energized by engaging the switch 28 with the terminal 29 and the switch-levers 35 36, reversed and engaged with the terminals 39 40, so as to cause the electric motor to run the vehicle in a reverse direction, if so desired, the switch 60 being at such time open.

As represented in Fig. 3, the motor-controlling switches 35 36 and the clutch-controlling switch 28 are shown separately; but, if desired, said switches may be combined after the manner represented in Fig. 5, so that the operation of the magnetic clutch and of the electric motor may be controlled by a single lever or handle 52.

Referring to Fig. 5, the switch 28 is represented as an arm depending from the blades 35 at the center of the same, and two sets of terminals 29 30 are located on opposite sides of the central or open position of the arm 28. It will thus be seen that when the lever 52 is turned to bring the blade 35 into engagement with the terminal 37 the switch-arm 28 is moved in the opposite direction and engaged first with the button or terminal 30 and then with the terminal 29, with which latter terminal the switch-arm 28 makes contact when the blade 35 engages the terminal 37, thus closing the circuit of the clutch and of the motor. When the lever 52 is moved back into its central or starting position, the circuit of the motor is broken between the blade 35 and the terminal 37 and of the clutch between the arm 28 and terminal 29 and again made between the arm 28 and terminal 30, at which time a reverse current is transmitted through the clutch. The operation is the same when the blade 35 is engaged with and disengaged from the terminal 39.

In the present instance the engine is represented as provided with four piston-rods 62, (see Fig. 1,) each connected to a crank 63 on the engine-shaft $g$. Each piston-rod 62 is connected to its own piston, (not shown,) which reciprocates in its own cylinder, each of which is provided with a magnetically-operated exhaust-valve 61, four such valves being represented in Fig. 4, one end of the coil of each magnet being connected to brushes 66 67 68 69, which coöperate with a segmental ring 70, mounted on a drum or sleeve 71, and the other end electrically connected with a continuous metal ring 72, also mounted on said drum, and with which coöperates a brush 73, connected by the wire 74 with the storage battery. The sleeve or drum 71 is mounted on the crank-shaft $g$ and is driven therefrom by a gear 75 on the crank-shaft, meshing with a gear 76 on a stud-shaft 77 and having attached to it a pinion 78, which meshes with a gear 79 on the sleeve or drum 71. (See Figs. 8 and 9.)

By reference to Fig. 4 it will be seen that at each revolution of the drum or sleeve 71 the circuit of each exhaust-valve is opened when the cut-away portion of the segmental ring 70 passes under each of the contact-brushes 66 67 68 69 and said brushes are carried by a suitable support 80, (see Figs. 2, 8, and 11,) revolubly mounted on the sleeve or drum 71, so that the position of said brushes may be changed with relation to the cut-away portion of the ring 70 to vary the speed of the vehicle. The sleeve 71 is also provided with a projection 83, (see Fig. 7,) which coöperates with brushes or terminals 84 85 86 87, which are connected by wires 88 89 90 91 with the spark-plugs or igniters 92 93 94 95 of the engine $f$. The projection 83 is connected by the brush 96 and wire 97 with the secondary winding 98 of the spark-coil, the primary winding 99 of which is connected by wires 100 101 with brushes 102 103, coöperating with a conducting-sleeve 104, also mounted on the crank-shaft $g$.

One of the features of the present invention consists in providing means under control of the foot of the operator for changing the position of the brushes 66 67 68 69 for bringing the brushes 102 103 into contact with the sleeve 104 and for completing the circuit of the electrically-operated valves. For this purpose a rock-shaft 105 (see Figs. 2 and 8) is supported in suitable bearings 106 and has fast on it the switch-arm 60, which coöperates with the terminal brush 110, which parts perform the same function as the hand-operated switch 60 and terminal 110. (Shown in Fig. 4.) The rock-shaft 105 also has connected to it an arm 112, (see Figs. 2, 8, and 12,) to which is fastened rods 114 115, which engage the rotatable support 80, and a crank 200, carrying a holder 201 for the brushes 102 103, so that when the rock-shaft 105 is rocked by the operator pressing his foot upon an upright crank or pedal 116, attached to the rock-shaft, as shown in Figs. 1 and 2, the switch-arm 60 is engaged with the terminal 110, the brushes 66 67 68 69 are shifted with relation to the segmental ring 70, and the brushes 102 103 are engaged with the conducting-sleeve 104. The rock-shaft 105 and the parts actuated thereby may be restored to their normal position by a spring 117, attached to the arm 112. (See Figs. 2, 8, and 12.)

By gearing the armature-shaft of the electric motor down to the crank-shaft I am enabled to obtain a maximum pulling effect on the driven shaft $c$ with a motor of minimum size, thereby materially lightening the weight of the vehicle and reducing the cost of the electric-motor equipment. The electric motor is not designed to run the vehicle at high speed, but is merely designed to run the same at slow speeds, approximately about six or seven miles an hour, and is used for starting the vehicle and in assisting the engine on hills and rough places.

The electric motor is of the series type, with its armature geared down with relation to the engine-shaft, so as to obtain the maximum pull on the driven shaft. In the present instance the electric motor is connected with the crank-shaft of the engine by a magnetic clutch, which is disconnected therefrom by means of a hand-operated switch; but I do not desire to limit my invention in this respect, as the clutch may be rendered inoperative by automatically opening the circuit of the clutch-winding 15 when the engine has attained a predetermined speed.

One form of automatic controller is represented in the present instance and consists of a circuit-controller or switch 120, pivoted to the clutch-disk 14 and having attached to it a weighted arm 121, the switch 120 coöperating with a circuit-terminal 122 on the disk 14 and normally held in engagement therewith by a spring 123 while the crank-shaft $g$ is running at a substantially slow speed, but which is automatically disengaged therefrom by the weight 125 under the influence of centrifugal action when the speed of the shaft $g$ has reached a predetermined point at which it is not desired that the motor should be driven.

It will be understood that while the electric motor is designed to run the vehicle at a speed of about six or seven miles the gas-engine is the prime motor and is designed to run the carriage at a much higher speed.

By having the exhaust-valves of the engine normally open and the sparker disconnected when the vehicle is operated by the electric motor the engine is also driven, but without doing work and without imposing any material additional work upon the electric motor.

By placing the valve-controlling switch and the speed-changing mechanism under control of the foot of the operator the latter is better enabled to control the vehicle, as both hands are free to manipulate the steering-wheel 130.

I claim—

1. The combination with a vehicle, of an explosion-engine carried thereby and having its crank-shaft connected directly with the rear axle of the vehicle, a storage battery carried by said vehicle, an electric motor connected in circuit with said storage battery, gears connecting the armature of said motor with the crank-shaft of said engine, a magnetic clutch to render one of said gears fast on said crank-shaft, and a circuit-controller to govern the operation of said magnetic clutch, substantially as described.

2. The combination with a vehicle, of a prime motor therefor comprising an explosion-engine having its crank-shaft connected with the shaft to be driven, an auxiliary motor for said vehicle comprising an electric motor having its armature geared down to the crank-shaft of the explosion-engine, mechanism for gearing down said armature, a clutch coöperating with said mechanism to connect the same with said crank-shaft to permit the crank-shaft to be rotated by the motor or to be rotated without producing rotation of the motor, a battery in circuit with said electric motor, and means to control said circuit, substantially as described.

3. The combination with a vehicle, of a prime motor therefor comprising an explosion-engine having its crank-shaft extended longitudinally of the vehicle and connected with the shaft to be driven, a gear loosely mounted on said crank-shaft, an electric motor, a pinion on the armature-shaft of said motor in mesh with the gear on the crank-shaft a clutch to render said gear fast on said crank-shaft and thereby couple the electric motor to said crank-shaft, a battery carried by the vehicle and in circuit with said motor, and means to control the circuit of said motor, substantially as described.

4. The combination with a vehicle, of a prime motor therefor comprising an explosion-engine having its crank-shaft connected with the shaft to be driven and composed of sections, a clutch member normally loose on said section, an electric motor, gearing connecting the armature-shaft of said motor with the normally loose clutch member, a clutch member fast on one of said sections and controlling the connection of the electric motor with said crank-shaft a battery in circuit with the electric motor, and a controller for said circuit, substantially as described.

5. The combination with a vehicle, of a prime motor therefor comprising an explosion-engine having its crank-shaft connected with the shaft to be driven, an auxiliary motor for said vehicle comprising an electric motor having its armature geared down to the crank-shaft of the explosion-engine, mechanism for gearing down said armature, a magnetic clutch coöperating with said mechanism to render the same fast on said crank-shaft and controlling the operation of said motor without affecting the action of the prime motor on the shaft to be driven, a battery in circuit with said electric motor, and a circuit-controller governing the circuit of said electric motor, substantially as described.

6. The combination with a vehicle, of a prime motor therefor comprising an explosion-engine provided with a magnetically-operated valve and having its crank-shaft connected with the shaft to be driven, an auxiliary motor for said vehicle comprising an electric motor having its armature geared down to the shaft to be driven, mechanism for gearing down said armature, a magnetic clutch coöperating with said mechanism, a storage battery connected in circuit with said electric motor, a controller for said circuit, a circuit connecting said battery with the magnetically-operated valve, and a controller for the circuit including the said valve, substantially as described.

7. The combination with a vehicle, of a prime motor therefor comprising an explosion-engine having its crank-shaft connected directly with the rear axle of said vehicle, an auxiliary motor comprising a series electric motor having its armature geared down to said crank-shaft, gears for gearing down said armature, a magnet coöperating with one of said gears to render it fast on the crank-shaft and controlling the connection of the motor with said crank-shaft, a battery connected in circuit with said motor, and means to control said circuit.

8. The combination with a vehicle, of a prime motor therefor comprising an explosion-engine having its crank-shaft connected with the shaft to be driven, an auxiliary motor for said vehicle comprising an electric motor having its armature geared down to the crank-shaft of the explosion-engine, mechanism for gearing down said armature, a clutch coöperating with said mechanism to connect the same with said crank-shaft, and means rendered effective at a predetermined speed of the crank-shaft for disconnecting the motor from said crank-shaft, substantially as described.

9. The combination with a vehicle, of a prime motor therefor comprising an explosion-engine having its crank-shaft connected with the shaft to be driven, an auxiliary motor for said vehicle comprising an electric motor having its armature geared down to the crank-shaft of the explosion-engine, mechanism for gearing down said armature, a magnetically-operated clutch for connecting said mechanism with said crank-shaft, and a circuit-controller automatically operated at a predetermined speed of the crank-shaft for rendering the magnetically-operated clutch inoperative, substantially as described.

10. The combination with a vehicle, of a prime motor therefor comprising an explosion-engine having its crank-shaft connected with the shaft to be driven, an auxiliary motor for said vehicle comprising an electric motor, mechanism for connecting the armature of said motor with the shaft to be driven, a clutch controlling the connection of said armature with said driven shaft, and means operated at a predetermined speed of the vehicle for disconnecting the electric motor from said driven shaft, substantially as described.

11. The combination with a vehicle, of a prime motor therefor comprising an explosion-engine having its crank-shaft connected with the shaft to be driven and provided with a magnetically-operated valve, a circuit-controller governing the operation of said valve, and mechanism under control of the foot of the operator for operating the said circuit-controller, substantially as described.

12. The combination with a vehicle, of a prime motor therefor, comprising an explosion-engine having its crank-shaft connected with the shaft to be driven, mechanism for varying the speed of the engine, and means under control of the foot of the operator for operating said mechanism to effect a change in speed of the engine, substantially as described.

13. The combination with a vehicle, of a prime motor therefor comprising an explosion-engine having its crank-shaft connected with the shaft to be driven, an auxiliary motor for said vehicle comprising an electric motor, mechanism for connecting the armature of said motor with the shaft to be driven, a magnetically-operated clutch controlling the connection of the armature of said electric motor with the shaft to be driven, a circuit-controller governing the operation of said clutch, a circuit-controller governing the operation of said motor, and means for effecting movement of said circuit-controllers simultaneously, substantially as described.

14. The combination with a vehicle, of a prime motor therefor comprising an explosion-engine having its crank-shaft connected with the shaft to be driven, an auxiliary motor for said vehicle comprising an electric motor, mechanism for connecting the armature of said motor with the shaft to be driven, a magnetically-operated clutch controlling the connection of the armature of said electric motor with the shaft to be driven, a circuit-controller governing the operation of said clutch, a circuit-controller governing the operation of said motor, and a common actuating device for said circuit-controllers; substantially as described.

15. The combination with a vehicle, of a prime motor therefor comprising an explosion-engine having its crank-shaft connected with the shaft to be driven, an auxiliary motor for said vehicle comprising an electric motor, mechanism for connecting the armature of said motor with the shaft to be driven, a clutch controlling the connection of the armature of said electric motor with the shaft to be driven, a circuit-controller governing the operation of said clutch, a circuit-controller governing the operation of said motor, and a common actuating device for said circuit-controllers, substantially as described.

In testimony whereof I have signed my name to this specification in the presence of two subscribing witnesses.

RALPH O. HOOD.

Witnesses:
JAS. H. CHURCHILL,
J. MURPHY.